US007444545B2

(12) United States Patent
Asano et al.

(10) Patent No.: US 7,444,545 B2
(45) Date of Patent: Oct. 28, 2008

(54) COMPUTER SYSTEM, MANAGING COMPUTER AND RECOVERY MANAGEMENT METHOD

(75) Inventors: Masayasu Asano, Yokohama (JP); Takayuki Nagai, Machida (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 11/330,929

(22) Filed: Jan. 11, 2006

(65) Prior Publication Data
US 2007/0112883 A1 May 17, 2007

(30) Foreign Application Priority Data
Nov. 16, 2005 (JP) .............................. 2005-331502

(51) Int. Cl.
*G06F 11/00* (2006.01)
(52) U.S. Cl. ............................................ 714/15; 714/2
(58) Field of Classification Search .................. 714/15, 714/2, 5, 16, 20; 718/100
See application file for complete search history.

(56) References Cited

U.S. PATENT DOCUMENTS

| | | | | |
|---|---|---|---|---|
| 7,076,620 | B2 * | 7/2006 | Takeda et al. ............... | 711/161 |
| 7,356,657 | B2 * | 4/2008 | Mikami ....................... | 711/161 |
| 2004/0172509 | A1 * | 9/2004 | Takeda et al. ............... | 711/162 |
| 2005/0015416 | A1 | 1/2005 | Yamagami | |
| 2006/0174076 | A1 * | 8/2006 | Takeda et al. ............... | 711/162 |
| 2007/0028139 | A1 * | 2/2007 | Wahl et al. ...................... | 714/6 |

* cited by examiner

*Primary Examiner*—Dieu-Minh Le
(74) *Attorney, Agent, or Firm*—Townsend and Townsend and Crew LLP

(57) ABSTRACT

The invention provides a method for computing the appropriate capacity of a journal volume based on the operating patterns of backup and recovery performed by the user, and composing a recovery system that enables recovery to be performed in a short time using journals. The invention provides a computer system comprising a storage system 120 having a volume 124, a managing computer 100 and a host computer 110, wherein the storage system 120 retains a journal of data stored in the volume and a volume replicating the data stored in the volume, and restoring a volume data at any update time point based on the journal and the replicated volume, and upon receiving operation from a user regarding the volume retaining the journal, the managing computer 100 acquires a registration creation demand including a recovery time objective which is the time to be restored and/or a recovery point objective which is the recovery time point and a journal retention period which is the period for retaining the journal, monitors the journal of data stored in the volume, computes the quantity of the journal, and determines the capacity of the volume for retaining the journal.

19 Claims, 9 Drawing Sheets

203: JOURNAL HEADER
204: JOURNAL DATA

FIG.3

| VOLUME ID | STORAGE ID | STORAGE VOLUME ID | CAPACITY | ATTRIBUTE |
|---|---|---|---|---|
| VOL1 | 1 | 1 | 10G | DATA VOLUME |
| VOL2 | 1 | 2 | 30G | DATA VOLUME |
| VOL3 | 1 | 3 | 10G | DATA VOLUME |
| VOL4 | 1 | 4 | 100G | JOURNAL VOLUME |
| VOL5 | 2 | 1 | 200G | DATA VOLUME |
| VOL6 | 3 | 1 | 10G | DATA VOLUME |

| VOLUME ID | HOST ID | MONITORING PERIOD |
|---|---|---|
| VOL1 | HOST-A | 2 DAYS |
| VOL2 | HOST-B | 1 DAY |
| VOL7 | HOST-C | 2 DAYS |
| VOL8 | HOST-D, HOST-E | 2 DAYS |

| STORAGE ID | FREE SPACE |
|---|---|
| 1 | 10T |
| 2 | 20T |
| 3 | 1T |

| JOURNAL HEADER CAPACITY |
|---|
| 100 |

| RECOVERY DATA QUANTITY PER 1 SEC. |
|---|
| 10M |

300: VOLUME TABLE
310: VOLUME MONITOR SETTING TABLE
320: STORAGE FREE SPACE TABLE
330: JOURNAL HEADER CAPACITY TABLE
340: RECOVERY DATA QUANTITY TABLE

JOURNAL VOLUME DESIGNATION SCREEN

FIG.5

500: RECOVERY MANAGEMENT TABLE

| CHECKPOINT | TIME | JOURNAL QUANTITY | CHECKPOINT DEFINITION | RESTORE METHOD | BEFORE JOURNAL CREATION |
|---|---|---|---|---|---|
| CP1 | 2005-7-1 0:10:00 | 300M | MARK | BASE VOLUME OF CP2 AND BEFORE JOURNAL | NONE |
| CP2 | 2005-7-1 0:20:00 | 200M | BASE | | TRACKING BACK TO CP1 |
| CP3 | 2005-7-1 0:30:00 | 200M | MARK | BASE VOLUME OF CP2 AND AFTER JOURNAL | NONE |
| CP4 | 2005-7-1 0:40:00 | 250M | MARK | BASE VOLUME OF CP3 AND BEFORE JOURNAL | NONE |
| CP5 | 2005-7-1 0:50:00 | 150M | BASE | | TRACKING BACK TO CP4 |
| CP6 | 2005-7-1 1:00:00 | 200M | MARK | BASE VOLUME OF CP3 AND AFTER JOURNAL | NONE |
| .... | .... | .... | .... | | |

510: WRITE MANAGEMENT TABLE

| CHECKPOINT | TIME | WRITE QUANTITY | NUMBER OF WRITE |
|---|---|---|---|
| CP1 | 2005-7-1 0:10:00 | 297M | 30000 |
| CP2 | 2005-7-1 0:20:00 | 198M | 20000 |
| CP3 | 2005-7-1 0:30:00 | 198M | 20000 |
| CP4 | 2005-7-1 0:40:00 | 247.5M | 25000 |
| CP5 | 2005-7-1 0:50:00 | 148.5M | 15000 |
| CP6 | 2005-7-1 1:00:00 | 198M | 20000 |
| .... | .... | .... | .... |

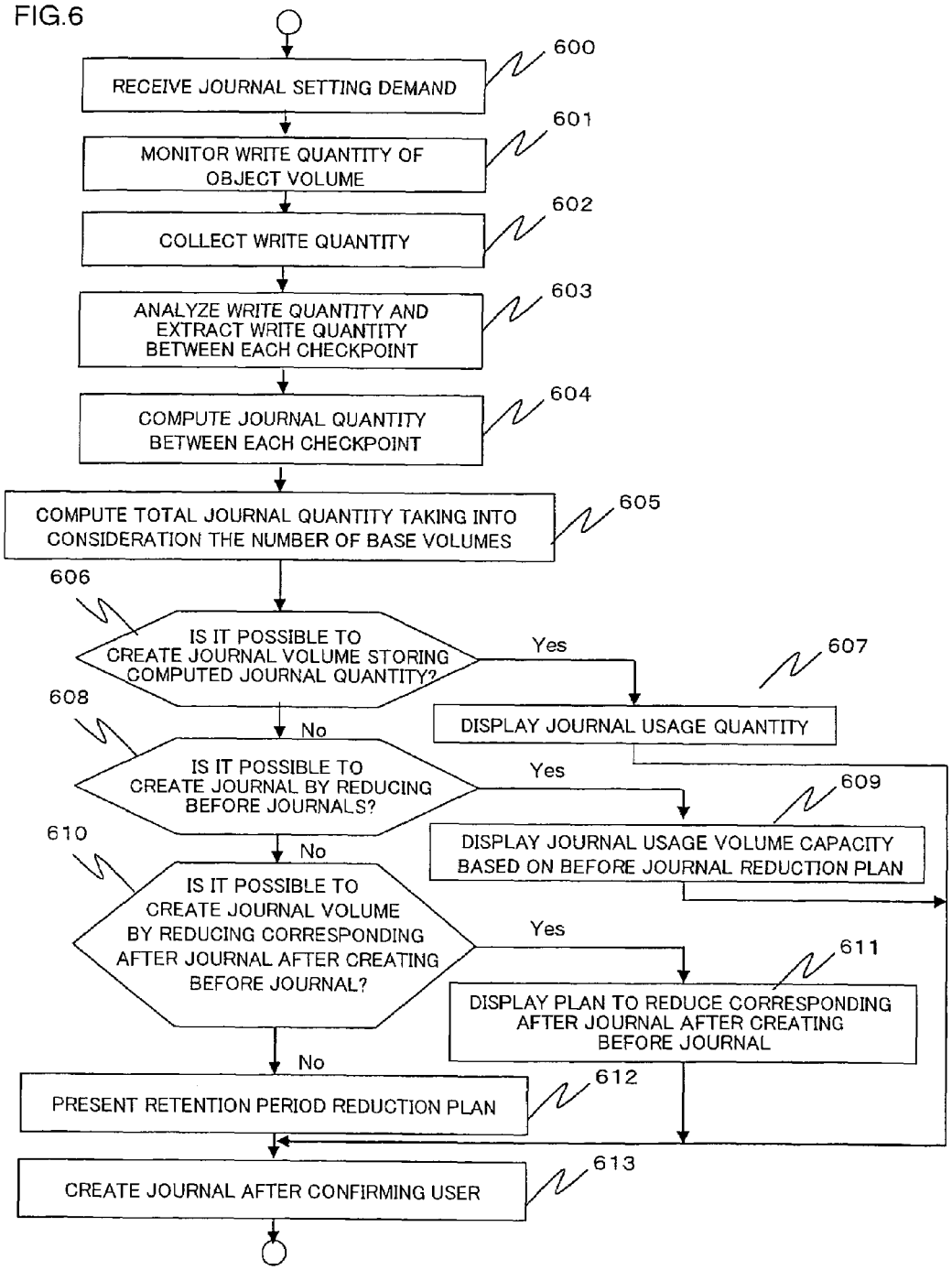

COMPUTER SYSTEM, MANAGING COMPUTER AND RECOVERY MANAGEMENT METHOD

The present application is based on and claims priority of Japanese patent application No. 2005-331502 filed on Nov. 16, 2005, the entire contents of which are hereby incorporated by reference.

BACKGROUND

The present invention is related to a data backup and recovery system of a computer system having a computer and a storage.

Along with the increase in data capacity of storages in a computer systems of a business organization or the like, not only the data used for normal operations but also the backup data of the data used for normal operations have increased. Backup data is acquired routinely at certain intervals (for example, once a day), and it is common to acquire multiple generations of backup data corresponding to the data for normal operation. If a failure occurs during normal operation, the data at a certain point in time is recovered using the backup data. However, even if multiple generations of backup data are acquired, the backup data may be somewhat different from the data of the desired recovery time due to limited resources and the like. For example, if tapes are used to store backup data, the tapes are reused over and over again since the number of tapes is limited. At this time, if a backup data is acquired every day at 0:00 and data destruction occurs at 23:00, the latest backup data using the backup data in the tape is 23 hours before the desired recovery time. In other words, the recovery point intervals are too long.

In order to solve this problem, an art is provided in which journal data of the normal operation data are acquired to recover lost data (for example, refer to US Patent Application Publication 2005/0015416 A1, hereinafter referred to as patent document 1). According to patent document 1, journaling of write data to the storages is performed to create a volume having the data of the volume immediately before the journaling (hereinafter referred to as "base volume"), to enable recovery of data at any point in time by applying the journal of a desired point in time to the base volume.

The journal may be defined as an after journal, which is the journal of the data after the update of write data, and a before journal, which is the journal of the data before the update of write data (refer for example to patent document 1). By acquiring after journals and before journals, and by applying the after journals and before journals to a volume taken at some timing, it becomes possible to return the volume data to an older data or to update the volume data to a newer data. Thus, data of any return timing can be acquired and recovery data can be created using the journal data with flexibility.

The conventional method described above has the following drawbacks. Since data is added to the journal every time a write data is acquired, if the amount of write data becomes excessive, the usage of the journal data storage area may become 100%. Then, the journal data may overflow from the storage area so that the latest journal data cannot be added, or the journal data may overwrite necessary data so that old journal data is deleted.

According to patent document 1, a snapshot is created using the base volume and journal data before the data overflows, and the old journal data used for creating the snapshot can be deleted after the snapshot is created. However, according to the art of patent document 1, the processing costs related to creating snapshots are great if there are much journal data, and the number of snapshots and as a result the number of volumes become excessive, using up much management resources within the storages. Therefore, it becomes necessary to set up appropriate capacities of the areas for storing the journal data (hereinafter referred to as journal volume) and the timing for creating the snapshots, and present the result to the user.

Furthermore, the user must designate the capacity of the journal volume by considering the access status of the hosts and usable resources, and the user must designate the recovery demand by considering the timing for returning to the recovery point and the time required for recovery. Therefore, it is difficult for the user to estimate the required capacity.

SUMMARY

The present invention aims at providing a method for establishing a recovery system capable of computing the appropriate journal volume capacity based on the operation statuses related to the backup and recovery performed by the user, in other words, the recovery point, the recovery time and the journal retention period, and enabling recovery using journals to be performed in a short time.

In order to solve the above-mentioned problems, the present invention monitors the access to volumes of the corresponding host computer (hereinafter also simply referred to as host), and determines the capacity of the journal volume and the creation timing of the base volume corresponding to the recovery demand of the user. Further, the timings of checkpoints at which the user is enabled to designate the data recovery time are determined. Here, the host utilizes a cache and the like to manage data, so that the data in the host is inconsistent with the data in the storage volumes. Therefore, in order to restore the data of the host by the storage, it is necessary to have the data in the host correspond with the data in the storage. It is possible to have the data correspond at certain points and apply them as checkpoints.

Further, the recovery demand of the user includes the recovery point objective, the recovery time objective and the journal retention period. According to some demands, the user designates a maximum journal volume capacity and an object host. The journal is written when a write access to a corresponding host is provided to a corresponding volume. Therefore, the volume access of the corresponding host monitors the write status. Then, the after journal is computed based on the write quantity during a monitored period, the increase of journal management area for managing the write status as journals, and the actual journal retention period. The above settings enable to adjust the recovery point and recovery time designated by the user, reduce the influence of the host to the journal operation and prevent the increase of journal quantity or the increase of number and quantity of base volumes.

The present invention provides a computer system comprising a storage system having a volume which is a storage area, a managing computer for managing the storage system, and a host computer for reading and writing data in the volume of the storage system, which are connected via a network, wherein the storage system retains a journal of the data stored in the volume and a volume replicating the data stored in the volume, for restoring the data stored in the volume at any update time point by the journal and the replicated volume, and the managing computer acquires a register creation demand including a recovery time objective which is the time of recovery and/or a recovery point objective which is the update time point and a journal retention period which is the period during which the journal is retained, monitors the journal of the data stored in the volume, computes the quantity of the journal, and determines the capacity of the volume for retaining the journal.

The present invention enables to realize a recovery management system capable of having the journals set easily according to the operation demands of the user, which corresponds to the demands of the user and the use of the storages.

BRIEF DESCRIPTION OF THE DRAWINGS

FIG. 3 is a view showing one example of a table utilized in the computer system of embodiment 1;

FIG. 5 is a view showing one example of a setting screen utilized in the computer system of embodiment 1;

FIG. 6 is a view showing one example of a flowchart indicating the procedure for computing and setting a journal quantity according to embodiment 1;

DETAILED DESCRIPTION OF THE PREFERRED EMBODIMENTS

The preferred embodiments for carrying out the present invention will be described.

Now, the preferred embodiments of the computer system, managing computer and recovery management method according to the present invention will be described in detail with reference to the drawings.

Embodiment 1

Figure 1:
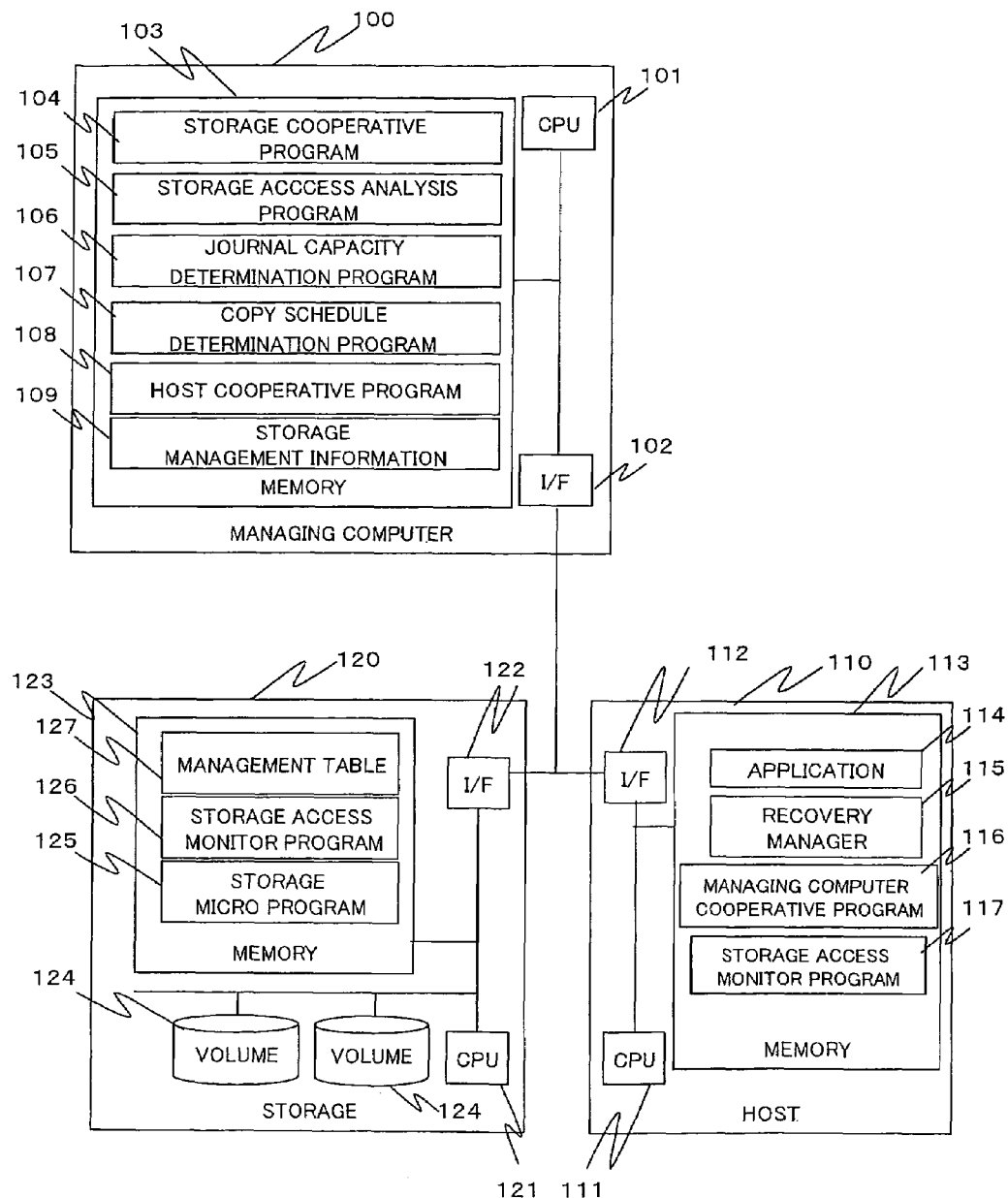
FIG. 1 is a view showing one example of a configuration of a computer system according to embodiment 1.

Embodiment 1 will now be described. FIG. 1 is a chart showing the configuration of a computer system according to a first embodiment of the present invention. A storage 120 includes volumes 124, which are storage areas for storing data actually operated by a computer (such as a host computer 110). The volumes 124 can be media such as hard disks, or volumes having multiple hard disks and realizing RAID structured volumes. The storage further includes an I/F 122 for transmission and reception of data I/O related to reading and writing and communicating with the managing computer 100, a CPU 121 carrying out the actual control of reading and writing of data I/O, and a memory 123. The I/F 122 include independent communicating devices corresponding to different forms of communication if the forms of communication differs (for example, if the communication with the managing computer 100 is performed via IP (internet protocol) whereas the data I/O with the host 110 is performed via FC (fibre channel)). Further, even if the same protocol is used, I/F 122 can be disposed independently for different uses, for the communication with the managing computer 100 and for the communication with the host 110. The storage system may simply be referred to as "storage" hereafter.

The memory 123 includes a storage micro program 125 and a storage access monitor program 126, which are realized by execution via the CPU 121. It further includes a management table 127 managed by the storage micro program 125 and the storage access monitor program 126. The storage micro program 125 is a program for managing the configuration of the storage 120, having functions of a storage such as creating journal volumes corresponding to volumes 124 and performing recovery using the journal volumes, and letting the host 110 recognize the volumes 124 via the I/F 122. The storage access monitor program 126 is a program for monitoring the time of access and the contents of the access (write quantity, number of writes, etc.) to the storage and the access performance. The management table 127 is a table for managing the information used in the storage micro program 125, such as the information necessary to execute the recovery function using the journals.

The managing computer 100 comprises a CPU 101, a memory 103, and an I/F 102 for communicating with the storage 120 and the host 110. A storage cooperative program 104, a storage access analysis program 105, a journal capacity determination program 106, a copy schedule determination program 107 and a host cooperative program 108 for the managing computer are for realizing the process according to the preferred embodiment of the present invention. A storage cooperative program 104, a storage access analysis program 105, a journal capacity determination program 106, a copy schedule determination program 107 and a host cooperative program 108 are stored in the memory 103 of the managing computer 100, which are realized via execution of CPU 101. Storage management information 109 are information used by the storage cooperative program 104, the storage access analysis program 105, the journal capacity determination program 106, the copy schedule determination program 107 and the host cooperative program 108.

A host 110 is a computer for storing and editing data of the host in the volumes 124 by sending and receiving data I/O via I/F 112 to the volumes 124 of the storage 120. The host 110 includes the aforementioned I/F 112, CPU 111 and a memory 113. In an example where the host 110 is managed by the managing computer 100, a managing computer cooperative program 116 in the memory 113 of the host 110 is used to send and receive information to the managing computer 110 via I/F 112. Further, an application 114 of the host 110 is a program for executing operations performed in the host 110. The application 114 includes a data management for updating and creating data in the volumes 124 of the storage 120, and a backup management for replicating data. A recovery manager 115 is a program for replicating or recovering volumes by cooperating with the storage micro program 125 of the storage 120. A storage access monitor program 117 is a program for monitoring the access time and the contents of the access (write quantity and number of writes) to the storage and the access performance. The application 114, the recovery manager 115, the managing computer cooperative program 116 and the storage access monitor program 117 stored in the memory 113 are executed by CPU 111. The I/F 112 is connected to the managing computer 100 and the storage 120, but if transmission and reception of information with the managing computer 100 is performed via a protocol such as TCP/IP and that with the storage 120 is performed via a different protocol such as fibre channel, in other words, if the connection is performed via different protocols, independent I/Fs can be provided in respective manner. In other words, if the same protocol is used to transmit and receive data between the host 110 and the managing computer 100 and between the host and the storage 120, the I/F 112 can be composed of a single IF system.

Figure 2:
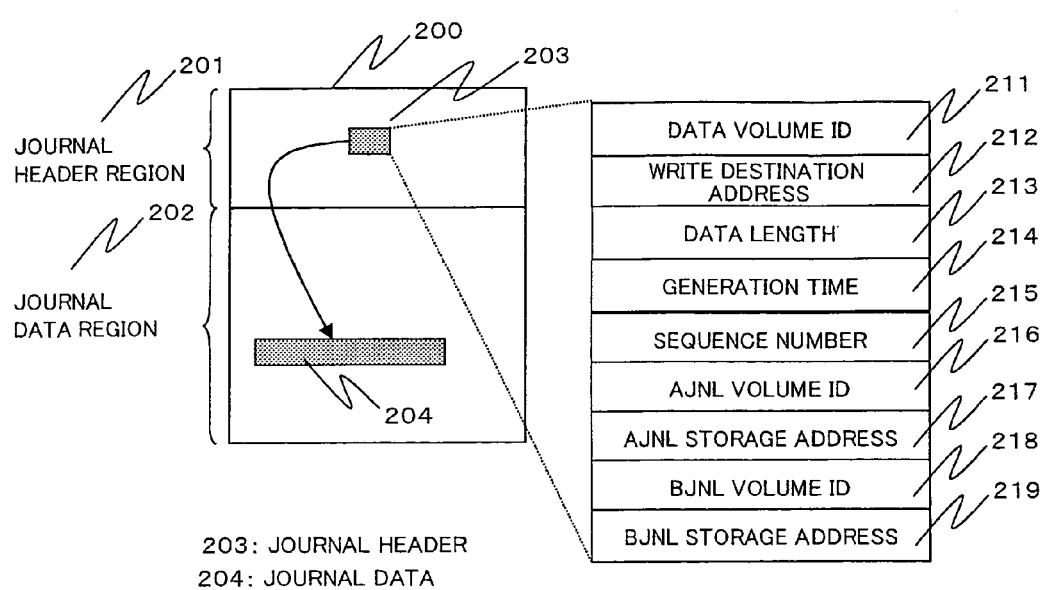
FIG. 2 is a view showing one example of a journal managed by the computer system of embodiment 1.

FIG. 2 shows a configuration of a journal volume. A journal volume is a volume composed of one or more volumes for storing journal data. The journal volume 200 is composed of a journal header region 201 for storing a journal header 203 for managing the journal, and a journal data region 202 for storing the actual journal data 204.

The journal header 203 is for storing managing information of each journal, including data volume ID 211, write destination address 212, data length 213, generation time 214, sequence number 215, AJNL volume ID 216 showing the ID of the volume storing the after journal, AJNL storage address 217 showing the address storing the after journal, BJNL volume ID 218 showing the ID of the volume storing the before journal, and BJNL storage address 219 showing the address storing the before journal. In order to determine the capacity of a journal volume from the above, it is necessary to compute the usage of the journal data 204 and the journal header 203.

Moreover, a checkpoint mark (hereinafter also referred to as "journal mark") for confirming that consistency is maintained between the data of the host 110 and the data of the storage 120 can be included in the member of the journal header 203. In this case, no special journal data is generated. By assigning a journal data prior to this flag to a base volume, a data having consistency can be recovered in the host 110. Even without utilizing the check flag, it is possible to perform a process to include a generation time in the journal when the managing computer 100 remembers the generation time having consistency or when it is confirmed in the host 110 that the data has consistency, and acquiring a snapshot of data only having this generation time. It is also possible to manage the time interval for inputting a checkpoint mark in connection with the interval of the recovery points. In other words, the host can handle data correctly if recovery is performed to a point in time in which the checkpoint mark is inputted, so that such point of time with checkpoints can be used as the recovery point.

FIG. 3 is an explanatory view of an example of a group of tables of the storage management information 109 used by the programs executed by the managing computer 100. The storage management information 109 includes a volume table 300, a volume monitor setting table 310, a storage free space table 320, a journal header capacity table 330, and a recovery data quantity table 340.

The volume table 300 stores information on the volumes of the storage, including a volume ID 301 for identifying the volumes, a storage ID 302 for identifying the storages, a storage volume ID 303 for identifying the volumes in the storages, a capacity 304 indicating the capacity of the volume, and an attribute 305 indicating the attribute of the volume. The attribute 305 identifies whether the volume is a data volume storing data used in the host 110 or the like or a journal volume handled as the journal. Therefore, if a journal volume is created, a volume information having the attribute 305 set to "journal volume" is registered in the table. The table 300 enables to identify the volumes of multiple storages upon managing multiple storages 120 by the managing computer 100. Further, the volume capacity corresponding to volume ID "VOL1" in capacity 304 in the example shown in FIG. 3 shows that the volume capacity is 10 G bytes.

A volume monitor setting table 310 stores a volume ID 311 for identifying the volume, a host ID 312 for identifying the host using the volume, and a monitoring period 313 which is the period set for monitoring the write quantity of the host. The monitoring period can designate the date or time as in the example in the table, or the start time and end time for carrying out the monitoring. The monitoring period can also be designated by the start time and date.

The storage free space table 320 stores the storage ID 321 for identifying the storages, and a free space 322 indicating the capacity of the free space of each storage. In the storage ID 321, the numbers equal to that of storage ID 302 of the volume table 300 refer to the same storage. Free space 322 shows the capacity of the unused space in storage 120 where data and journals are not stored. The unused free space is used to create a new journal volume. In other words, the capacity of the free space is equal to the journal volume capacity being newly created. In the example of FIG. 3, the free space of the storage designated by storage ID 1 is 10 T bytes.

The journal header capacity table 330 stores a journal header capacity 331 showing the capacity of the header for a journal by which the journal volume manages the journals. In order to manage journal data, the header becomes necessary each time the journal data is written. Since the capacity of the journal header must be considered to compute the journal quantity, the journal header capacity is included in determining the journal capacity. In the example of FIG. 3, the capacity of the journal header is 100 bytes.

The recovery data quantity table 340 stores a recovery data quantity 341 per one second indicating the quantity of recovery data being executed in one second. Using this data, the recovery time for executing recovery using the base volume and the time point of the journal is computed. In the example of FIG. 3, the recovery data quantity per one second is 10 M bytes.

Figure 4:
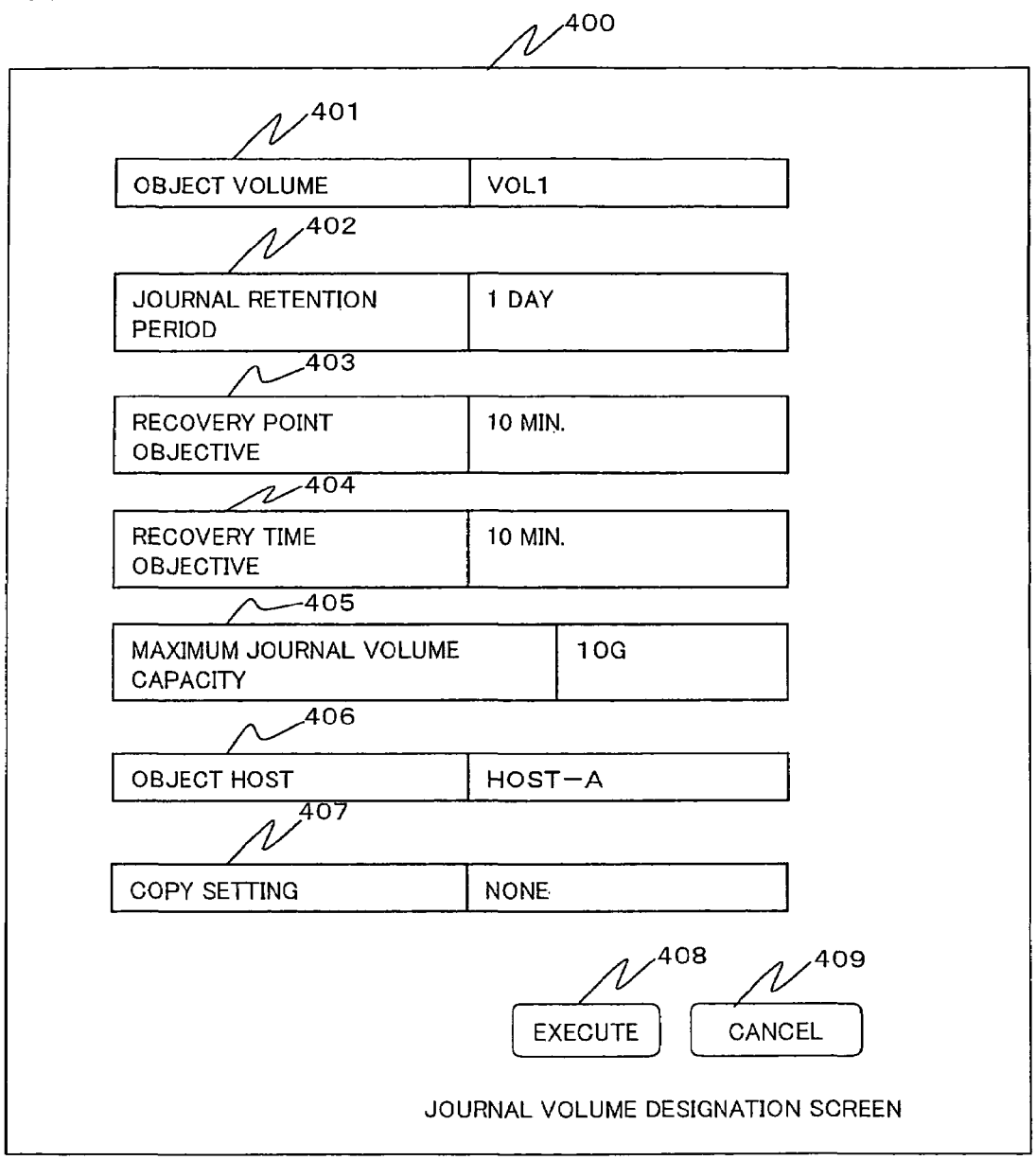
FIG. 4 is a view showing one example of a table utilized in the computer system of embodiment 1.

FIG. 4 is an example of a chart showing a screen through which a user demands a journal volume to be created. A journal volume designation screen 400 includes the following designation items: an object volume 401 for designating the volume whose replication should be managed by journals; a journal retention period 402 for designating the period for retaining the journal; a recovery point objective 403 for designating the recovery point objective; a recovery time objective 404 for designating the recovery time objective; a maximum journal volume capacity 405 where the user designates the usable journal volume; and an object host 406 for designating the host being the monitor object which is actually monitored data is written therein by the object volume 401.

The screen further includes a copy setting 407 as another designation item for designating whether or not a copy setting related to creating the journal volume is performed. The journal volume designation screen 400 is composed of the above-mentioned designation items 401 through 407, an execution button 408 for executing the creation of journal volume, and a cancel button 409 for canceling the same. It is possible to designate "yes" or "no" in the copy setting 407, wherein when "no" is designated, a procedure shown in the flowchart of FIG. 6 described later is carried out, and when "yes" is designated, a procedure shown in the flowchart of FIG. 7 described later is carried out.

If the user does not designate the maximum journal volume capacity 405, the maximum value for a journal can be set. If the object host 406 is not designated, it is possible to automatically select a host if it is possible to find the host that the object volume uses via a path setting or the like. If there are multiple volumes for a single object host, it is possible to designate multiple volumes for the object volume. If it is desirable to vary the designation per volume, it is possible to designate the object volume one by one.

As for the recovery point objective 403 and the recovery time objective 404, it is possible to perform designation per certain time intervals, so as to cope with various operation forms having limited times of operation or having greater write quantity during a certain period of time and smaller write quantity during other times. For example, the recovery objective time can be designated as 10 minutes during 8:00 to 17:00 where normal operation is carried out and the assumable write quantity is large, while the recovery objective time can be designated as one hour during other times where limited operation is carried out and assumable write quantity is small.

FIG. 5 shows a recovery management table 500 and a write management table 510, which are examples of tables contained in the table group managed by the storage management information 109 of the managing computer 100. A recovery management table 500 is prepared for each object data volume. The recovery management table 500 contains information on a checkpoint 501 showing the identifiers of checkpoints, a time 502 showing the time of the checkpoint 502, a journal quantity 503 indicating the journal quantity used between checkpoints, a checkpoint definition 504 designating whether to put a mark of the checkpoint in the journal or to create a base volume at the checkpoint, a restore method 505 showing the method of restoration when recovering data to the checkpoint, and a before journal creation 506 indicating whether or not to create a before journal upon creating the base volume, and if the before journal is to be created, to which point the before journal tracks back.

It is possible to newly add the mark of the checkpoint 501 as a member of the journal header 203 as described before, or it is also possible for the managing computer 100 to manage a time from the generation time 204 that can be managed as a checkpoint mark. For example, it is possible to manage that at the time of checkpoint CP1, the data of the host 110 can be restored using the base volume acquired at CP2 and the before journal.

In the example of FIG. 5, CP1 of checkpoint 501 is a point at 0:10 of Jul. 1, 2005, and the quantity of the journal started at 0:00 of Jul. 1, 2005 is 300 M. It is also indicated that the checkpoint is registered using a journal mark, and the method for restoring data of the checkpoint utilizes the base volume created at checkpoint CP2 and the before journal. It is also indicated that the before journal is not created at the time of the checkpoint since a base volume is not created. Moreover, the recovery management table 500 can store information related to creation of an after journal which is created when the base volume is created, such as to which point the after journal tracks back. The information can either be stored instead of the information on the before journal creation 506, or can be stored in an additional column.

The write management table 510 stores information on a checkpoint 511 having the same definition as the checkpoint 501 of the recovery management table 500, a time 512 having the same definition as the time 502 of the recovery management table 500, a write quantity 513 indicating the write quantity between checkpoints, and a write number 514 indicating the number of writes between the checkpoints. The write management table 510 is prepared for each volume. The write tendency of volumes between checkpoints is stored as information in the table, and the journal quantity between checkpoints is computed based on the information.

FIG. 6 is an example of a flowchart showing the process for creating a journal volume. In FIG. 6, step 600 and steps 604 through 612 correspond to steps of the journal capacity determination program 106, step 601 corresponds to a step of either the storage access monitoring program 117 of a host 110 or a storage access monitoring program 126 of storage 120, steps 602 through 603 correspond to steps of the storage access analysis program 105, and step 613 corresponds to a step of the storage cooperative program 104 and the storage micro program 125 of storage 120. Actually, the CPU reads the programs from the memory and executes the steps of the programs. In the following description, the programs may be described as the subject, but actually the CPU 101 which is the processing unit for executing the programs executes the processes.

At first, the journal capacity determination program 106 of the managing computer 100 accepts the journal setting demand from the user (step 600). The demand includes designation items shown in FIG. 4, which are the object volume designating the volume whose replication should be managed by journals, the journal retention period, the recovery point objective, the recovery time objective, the maximum journal volume capacity, and the object host.

Next, the storage access monitoring program 126 monitors storage access based on the demand received in step 600 to monitor the write quantity of the object volume (step 601). The storage access monitoring can be performed either by the storage 120 or by the host 110. If it is necessary to consider the cache quantity of the host 110, it is more accurate for the host to perform monitoring since it is capable of monitoring the write quantity of the cache. However, if the cache capacity is fixed or the write quantity of the cache can be computed by the access algorithm without monitoring the write to the cache, or if the recovery manager is demanded to perform data synchronization with the host, which is a process performed at the checkpoints, it is possible for the storage to monitor access. The selection can be performed by the user, or designated by the journal capacity determination program 106 that calls the monitoring program. As for the monitoring period, the value designated in the monitoring period 313 of the volume monitor setting table 310 is transmitted, and based thereon, the storage access monitoring program monitors the storage access.

Next, the storage access analysis program 105 collects the write quantity monitored in step 601 in the managing computer 100 (step 602). The data can be collected periodically from the storage access monitoring program or can be collected after the monitoring period has ended or when the storage access monitoring program terminates monitoring. In the example of FIG. 4, the monitoring period of volume VOL1 designated in the object volume 401 is two days, as shown in the volume monitor setting table 310 of FIG. 3, so the accesses during two days are monitored. The monitoring period can also be designated by the user in the screen of FIG. 4.

Next, the storage access analysis program 105 analyzes the write quantity collected in step 602 (step 603). The analysis is performed for every checkpoint. Then, the write time and write quantity of each volume is stored in the write management table 510. It is possible to store the analysis program in the storage access monitoring program 117 or 126 of the host 110 or storage 120, analyze the write quantity, and send the information corresponding to the write management table 510 to the managing computer.

Next, the journal capacity determination program 106 computes journal quantities between checkpoints based on the write quantity analyzed in step 603 and the journal setting demand acquired in step 600 (step 604). The journal is a sum of the journal data and journal header, as shown in FIG. 2. Thus, the after journal can be determined by the write data quantity, number of writes and journal retention time. The before journal is determined by the necessary before journal data based on the recovery point objective and recovery time objective of the after journals within the retention period. The header used for the after journal can be applied to the before journal, so the quantity is not especially increased.

In the journal, the write quantity is the capacity required as the after journal data area, and the value achieved by multiplying the number of writes and the journal capacity is the capacity required as the journal header area. The journal capacity for each checkpoint within the monitoring period is computed. In the example shown in the write management table 510 of FIG. 5, the write quantity of the period having the checkpoint ID CP1 is 297 M bytes, the number of writes is 30000, and the journal header capacity is 100 bytes as shown in journal header capacity table 330, so the capacity totals 300 M bytes. This information is stored in the recovery management table 500. In this way, the journal quantity is computed for each checkpoint and stored in the recovery management table 500.

Next, the journal setting demand in step 600 and the journal capacity determination program 106 computes the total journal number using the journal quantity for each checkpoint acquired in step 604 and the number of base volumes (step 605).

The before journal is determined by the recovery point and the recovery time requested in step 600. It is assumed from the recovery data quantity table 340 that the value assigned to the journal per one second is 1 M bytes. Further, it is assumed that the recovery point is every ten minutes and the recovery time is ten minutes. In order to perform recovery for each recovery point, the checkpoint is provided with the same interval as the recovery point.

The recovery time becomes the time in which the journal quantity is assigned from the base volume. Therefore, in the after journal, the quantity assigned to the journal within a recovery time of ten minutes is 600 M bytes.

At this time, based on the recovery management table 500, it is possible to assign up to checkpoint CP2 of checkpoint 501. If the journal is created only by after journals, the base volume is created at CP2 in order to maintain a recovery time of ten minutes.

By using before journals, it becomes possible to cut down the number of base volumes. By simple arithmetic, when before journals are assigned, the base volumes should be created at double the journal quantity compared to the recovery method using only after journals. For example, in the above-described example, in order to recover a data newer than certain base volume, it is possible to assign the 600 M bytes of data assigned to the after journals, and in order to recover a data older the base volume, it is possible to track back the data corresponding to 600 M bytes of journals. Thus, by using only after journals, a new base volume must be created for every 600 M bytes worth of journals. However, by using before journals, it becomes possible to perform recovery using a single base volume and 1200 M bytes worth of journals.

Therefore, by also using before journals, the base volume should be created when 1200 Mbytes worth of journals are created. Since a base volume is normally created by assigning an after journal to a base volume acquired one period of time before, the before journal can be created by clearing out the data of the base volume one period of time before the new volume each time the after journal is assigned.

By utilizing checkpoints in performing the recovery using journals, the before journal is only required to track back to each checkpoint, so in the example of the recovery management table 500, 600 M bytes worth of journals are assigned to the checkpoints CP3 and thereafter since the journals are required to track back to checkpoint CP3 and checkpoints newer than CP3 of checkpoint 501. It is not necessary to reflect the 200 M bytes of data between CP2 and CP3 on the before journal. Therefore, checkpoints CP3 through CP6 can be recovered using a base volume of a generation following the base volume applied to CP1 and CP2 and the before journals created when the new generation base volume is created. In conclusion, journals corresponding to 1300 M bytes instead of 1200 M bytes of data can be managed as journals corresponding to a single generation.

The above-described method mainly considers reducing the number of base volumes created in ten minutes, since the recovery time is set to ten minutes, but other methods are possible. It is possible to adopt a method in which the before journals are only aimed at reducing the recovery time, whereas the after journals determine the recovery time, and the before journals are to be created only when the recovery time can be cut down using before journals.

In this method, a following-generation base volume is created at or before checkpoint CP2 of the recovery management table 500. The recovery of CP1 is performed by a base volume and a journal, the journal being either a before journal or an after journal, but a before journal is created since the before journal only requires 200 M bytes of data to be assigned thereto. Next, of checkpoints CP3, CP4 and CP5, the following-generation base volume is created at CP5. At this time, the checkpoint CP3 can be recovered by the base volume and the after journal crated at CP2, and CP4 can be recovered by the base volume and the before journal created at CP5, and thus the recovery time is reduced. The example shown in recovery management table 500 follows the present processing method, and in checkpoint definition 504, the checkpoints CP1, CP3 and CP4 are defined as checkpoint marks on the journal, and CP2 and CP5 are defined by base volumes.

The above-mentioned process is utilized to compute the before journals within the journal retention period. In other words, in the example of the time up to CP5 of the recovery management table 500, 200 M bytes of journals between CP1 and CP2 and 150 M bytes of journals between CP4 and CP5 constitute before journals, so it is computed that a total of 350 M bytes of before journals must be created. Further, as for the after journal, since the journal quantity up to CP5 is a total of the journal quantity up to CP5, a total of 1100 M bytes is required. Thus, the total journal quantity up to CP5 is the total of before journals and after journals, which is 1450 M bytes.

Along with the above process, designation is made to which point the before journal covers and which journal to assign. According to the above example, they are indicated in the restore method 505 and the before journal creation 506 of the recovery management table 500. At checkpoint CP1, it is shown that data can be restored by using the base volume created at CP2 and assigning the before journal tracking back from the base volume to CP1, as shown in the restore method 505. Further, at checkpoint CP2, it is shown in before journal creation 506 that a before journal tracking back to CP1 is created when the base volume is created.

According to the example shown in FIGS. 3 and 4, the journal retention time of VOL1 which is the object volume 401 of FIG. 4 is one day, and the monitoring period is two days as shown in the volume monitor setting table 310. In this case, the data of the day having a larger journal quantity within the monitoring period or the average thereof are adopted. If a steady data is not obtained during the monitoring period, it is possible to extend the monitoring period or let the user make the selection.

Then, multiple processes for computing the journal quantity are adapted to select the one having a smaller base volume and smaller journal quantity. If one is larger, the selection can be performed by determining the priority or by presenting the result to the user.

If the number of base volumes is limited, there may be a case in which the number of base volumes exceeds the limited value during computation of the journal quantity. For example, it is assumed that the number of base volumes to a certain normal operation volume is limited to ten. The recovery time objective designated by the user is ten minutes. In this case, if there is a large journal quantity based on the calculation process of the journal quantity, there may be cases in which 11 or more base volumes are required to achieve the recovery time objective. In such case, the managing computer 100 can change the recovery time objective set by the user to 11 minutes, for example, and performs the computation again. It is also possible to notify the user of the status when it has been discovered that the number of base volumes exceeds the limitation during the journal quantity processing, to have the recovery time reset in the screen of FIG. 4.

According to the above process, the journal quantity is computed based on the write quantity to the volume from the host, but since during operation the computed quantity is not necessarily equivalent to the data during the monitoring period, it is possible to put a weight to the computed journal quantity, such as by doubling the computed value. For example, when it is computed that the journal quantity required during the journal retention period is 10 G bytes, it is possible to compute the journal quantity as 20 G bytes which is double the computed value.

Next, the journal capacity determination program 106 determines whether it is possible to create a journal volume storing the computed journal quantity (step 606). In other words, it determines whether or not it is possible to ensure as a journal volume a volume corresponding to the computed journal quantity. In this case, either the free space of the storage indicated in the storage free space table 320 or the maximum journal volume capacity 405 designated by the user is the object of comparison. Further, even if the maximum journal quantity is not designated, if it possible to acquire the free space that each user is enabled to use in the journal capacity determination program 106, the free space that can be used by the user providing the demand is also the object of comparison.

If it is possible to create the journal volume, the procedure advances to step 607, and if not, the procedure advances to step 608.

If the above journal quantity computation process satisfies a plurality of proposals, they can all be provided. It is also possible to determine priorities in the program and perform the prioritized journal computation, and when the first journal computation satisfies the conditions, the computation result can be provided and the procedure can be advanced to step 607.

The journal capacity determination program 106 presents the journal usage quantity to the user in step 607. It is possible to distinguish the after journal quantity and before journal quantity in the journal quantity. After completing step 607, the procedure is advanced to step 613.

The journal capacity determination program 106 checks whether the journal capacity can be ensured by deleting the before journals in step 608. It is not necessary to delete all the before journals. For example, the before journal or the after journal having a smaller difference in the recovery objective time is deleted in order until the journal can be created. At this time, it is also necessary to consider the creation timing of the before journal. If the journal is creatable based on these conditions, the procedure advances to step 609, and if not, the procedure advances to step 610.

The journal capacity determination program 106 displays and presents the journal usage volume capacity to the user in step 609. Further, the program presents to the user that not all the user's requests are satisfied according to conditions. For example, the journal usage volume capacity using only after journals computed in step 607 is presented. Then, as a hint, it presents that the journal quantity can be satisfied by deleting the before journals, but in that case, the objective recovery time cannot be achieved. After completing step 609, the procedure advances to step 613.

The journal capacity determination program 106 determines in step 610 whether the journal volume can be created by deleting the corresponding after journal after creating the before journal. The before journal is used to reduce the objective recovery time, and if the before journal is crashed, it is possible to carry out the recovery based on the after journal. However, according to the present case, a snapshot is created using either the before journal or the after journal. If the journal volume can be created based on these conditions, the procedure advances to step 611, and if not, the procedure advances to step 612.

The journal capacity determination program 106 displays and presents the corresponding after journal reduction plan to the user in step 611. It also presents that not all the user's requests are achieved according to conditions. As for the journal quantity, the quantities of the corresponding before journals and after journals are presented. After completing step 611, the procedure advances to step 613.

The journal capacity determination program 106 presents a plan to cut down the retention period in step 612, and presents the journal quantity reduction effect according to the reduced retention period. For example, by assuming that the journal retention period is set to 12 hours, the journal quantity corresponding to 12 hours is presented.

The storage cooperative program 104 creates a journal after confirming the user in step 613. In step 613, if the user does not like the alternative proposal presented in step 609, it is possible to have the process proceed to step 610. Further, in step 613, it is possible to add a process based on performance to enable the user to select whether to create two journal volumes instead of one, in other words, to select whether to use an existing journal volume or to use a new one.

Furthermore, if the user cancels the procedure in step 613 and restarts creation of the journal quantity from step 600, the write quantity must be monitored again if the monitored write data is invalidated, so the monitored write data acquired in step 602 can be retained when the procedure is cancelled in step 613 to thereby skip steps 601 and 602.

In step 607, if a sufficient journal usage quantity is ensured but the number of journal volumes to be created exceeds the planned number due to the arrangement of the journal volumes, it is possible to present the status to the user. Moreover, it is also possible to have the user select via an input screen or a confirmation screen whether to create the journal volume from an existing unused volume, from a free space, or to add the journal volume to an existing journal volume, or to create a new journal volume.

The order of processes of steps 608 and 609 can be switched with steps 610 and 611.

Further, it is possible to have the user perform detailed settings, or to have the management server determine the settings automatically and merely have the user confirm the same.

If the checkpoint mark is to be included in the journal header 203 for managing the journals of the storage 120, it is necessary to include the mark in the journal header quantity when computing the journal quantity.

Further, if an item is prepared in the screen of FIG. 4 that enables the user to request all before journals and after journals to be acquired, all the before journals and after journals are computed and presented to the user. Further, it is possible to reverse the application of use of the before journals and the after journals described above in the journal operation. In this case, it is possible to compute the journal quantity by creating before journals and also considering creating necessary after journals according to conditions such as recovery objective time. At this time, a column corresponding to creation of after journals is added to the recovery management table 500 to manage the creation of after journals.

The process illustrated in the above flowchart enables to compute the quantities of the after journals and before journals, compute the required total journal volume capacity and setup the journal volume based on the recovery demand of the user, such as the recovery point, recovery time and journal retention period.

Figure 7:
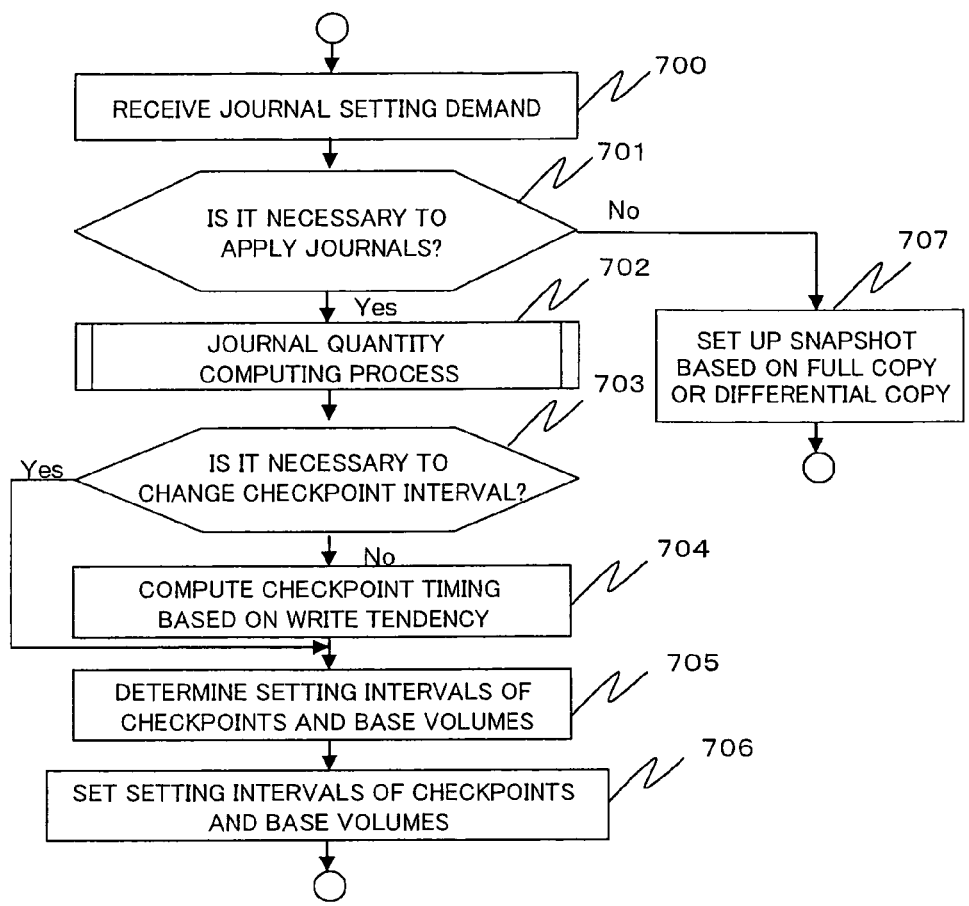
FIG. 7 is a view showing one example of a flowchart indicating the procedure for setting the timings of the checkpoints and base volumes according to embodiment 1.

FIG. 7 is an example of a flowchart illustrating the steps for determining the timings for creating checkpoints and base volumes. In FIG. 7, steps 700 and 702 correspond to the steps illustrated in FIG. 6, and step 700 is equivalent to step 600. Step 702 corresponds to steps 601 through 613. Other steps are carried out by the processes of the CPU 101 executing a copy schedule determination program 107 of the managing computer 100. In the following description, the program may be described as the subject, but actually the CPU 101 which is the processing unit for executing the programs executes the process.

At first, the journal capacity determination program 106 of the managing computer 100 receives a journal setting request from the user (step 700). The process illustrated in the flowchart of FIG. 7 is carried out when the copy setting 407 of FIG. 4 is set to "yes".

Next, the journal capacity determination program 106 checks whether a journal must be applied based on the demand received in step 700 (step 701). An application of a journal is not necessary when the recovery point time is long, in which case merely a conventional full copy process or a differential copy process is required. In the case where a copy is to be created without a journal, the procedure advances to step 707. If a journal must be applied, the procedure advances to step 702. For example, if the recovery point is one day and the journal retention period is also one day, a normal copy of the operating volume should be created and used over and over, so there is no need to create journals. In this case, the procedure advances to step 707.

Further, for example, if it is possible to create 24 generations of copies of a certain volume, and when the journal retention period requested by the user is one day and the recovery point objective is one hour, a copy of a volume is created every hour by copy generations of the volume. Also in this case, the procedure advances to step 707.

In step 702, the journal creation process illustrated in FIG. 6 is carried out.

The copy schedule determination program 107 determines in step 703 whether the intervals of checkpoints are appropriate or not. If the interval of checkpoints is designated as "ten minutes" without any designation of the period of time as in the example of FIG. 4, the time for issuing checkpoints is wasted, and other operations may be affected thereby if the write operation during a certain period of time is very small based on the monitored status. Further, if checkpoints not used for recovery are issued, the managed data becomes excessive. Moreover, by reducing the interval of recovery points during the time in which the write quantity is increased, the recovery points during actual operation is increased and the recovery point time is substantially reduced.

Therefore, a certain threshold of the write quantity is provided in the above process. The threshold is compared with the write quantity during the monitor process to determine whether or not to change the interval of the checkpoints. If the checkpoint interval is appropriate, the process is advanced to step 705, and if not, the process is advanced to step 704. For example, a threshold is provided to create a separate checkpoint if the journal quantity exceeds 300 M bytes in 10 minutes. At this time, since the journal quantity up to checkpoint CP1 is 300 M bytes as can be seen in the recovery management table 500, a separate checkpoint is created. In this case, the procedure advances to step 704.

In step 704, the copy schedule determination program 107 computes the checkpoint timing based on the write tendency, and compares the same with the threshold to compute whether increase or decrease of checkpoints is necessary. For example, at CP1, in order to provide a checkpoint when the journal quantity reaches half, a checkpoint is added when the journal quantity reaches half, or 150 M bytes, based on the various write data acquired in steps 702 and 703.

According to the above process, the copy schedule determination program 107 determines the setting intervals of the checkpoints and base volumes and prepares the execution environment in step 705. This process can be performed either after confirming the user or automatically.

Next, the copy schedule determination program 107 actually sets the setting intervals of the checkpoints and base volumes in step 706. The timings of checkpoints and base volumes are determined as shown in the recovery management table 500.

In step 707, the copy schedule determination program 107 carries out the setting via a copy function that does not use journals, by performing a whole copy in which the data of the original copy is copied completely to the copy destination.

If the number of checkpoints is limited, the processes of steps 703 and 704 can be performed based on the limitation.

The above process enables to set checkpoints and base volumes based on a recovery demand from a user by monitoring the access to the storage.

Figure 8:
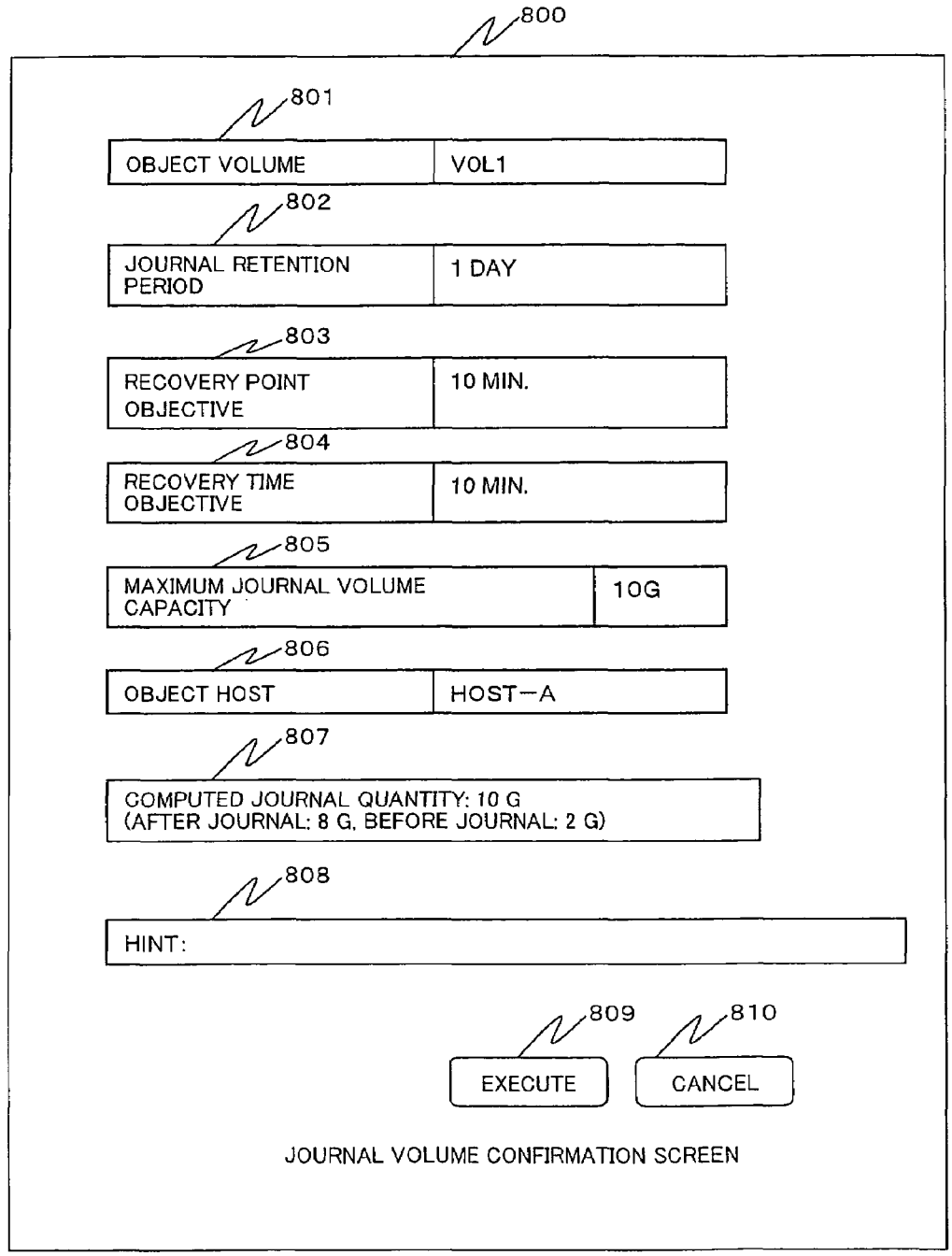
FIG. 8 is a view showing one example for displaying the journal quantity according to embodiment 1.

FIG. 8 shows an example of a journal confirmation screen which shows the journal quantity computed in the process of the flowchart of FIG. 6 after the instruction from a user to create a journal volume is provided in FIG. 4. The screen is used to display steps 607, 609, 611 and 612, and step 613 of FIG. 6 in which the actual process is executed.

The journal volume confirmation screen 800 includes an object volume 801, a journal retention period 802, a recovery point objective 803, a recovery time objective 804, a maximum journal volume capacity 805 and an object host 806 which are designated in FIG. 4, plus a computed journal quantity 807, a hint 808 used when the journal quantity cannot be created due to some reason, an execute button 809 and a cancel button 810.

The computed journal quantity 807 is the value displayed in step 607 of FIG. 6. Data is input to the hint 808 mainly in steps 609, 611 and 612. For example, the computed journal quantity 807 presents the quantity of only the after journals computed in step 607, while the hint presents that the journal quantity can be satisfied by reducing the before journals through the recovery time cannot be accomplished. Here, it is also possible to present both the after journals and before journals computed in step 607.

It is also possible to enable the user to correct the request in step 613 after confirming the user. In this case, the screen can be returned to the input screen of FIG. 4, or the computed journal quantity can be rewritten by the user and reflected in the process before the execute button is clicked.

The information presented in hint 808 is complex in some cases. For example, there are cases in which the journal quantities are varied by time as described earlier. In such case, the data in the write management table 510 can be presented as a graph to show where the threshold is exceeded, for example.

Further, if the values 401 through 404 entered by the user in the screen of FIG. 4 are changed in the flowchart of FIG. 6, it is possible to present the values computed in the flowchart of FIG. 6 in the display areas 801 through 804 of the screen, and to indicate the change by varying the color from the value at the time of input or by presenting characters such as (note) to the value, or output the derived value in hint 808 without changing the entered value. For example, if the value of the recovery time objective is different from the value input by the user, it is possible to indicate "(note) 20 min." in recovery time objective 804 and to present that "the input value of the recovery time objective was 10 min" in the hint 808.

Figure 9:
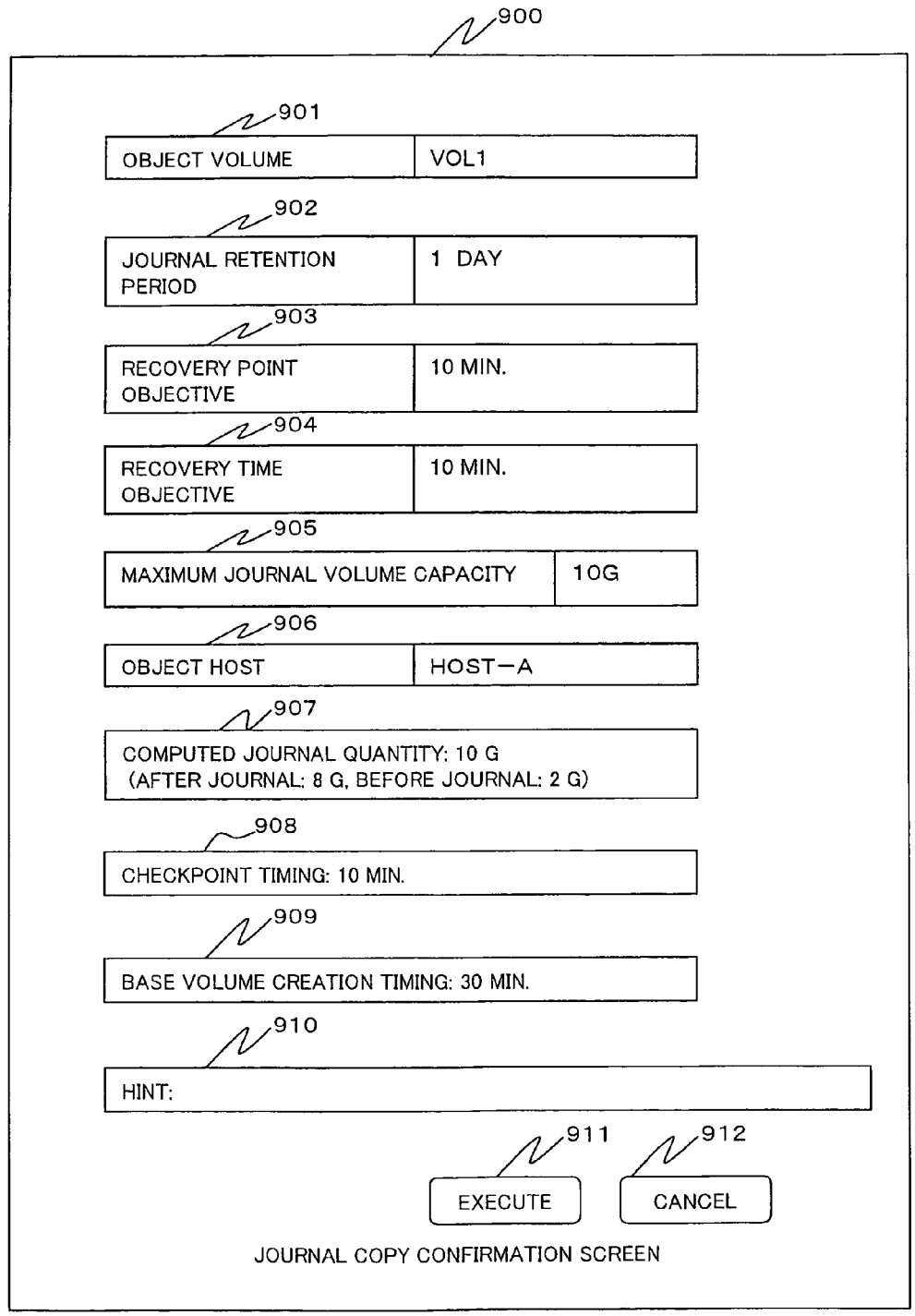
FIG. 9 is a view showing one example for displaying the timings of the checkpoints and the base volumes according to embodiment 1.

FIG. 9 is an example of a view showing a journal copy confirmation screen for presenting the journal quantity and the timings for creating the checkpoints and base volumes computed by the process in the flowchart of FIG. 7 after the creation of a journal volume is requested by the user in FIG. 4. The screen is used to request confirmation of the user in step 705 of the flowchart of FIG. 7.

The journal copy confirmation screen 900 includes an object volume 901, a journal retention period 902, a recovery point objective 903, a recovery time objective 904, a maximum journal volume capacity 905 and an object host 906 which are designated in FIG. 4, plus a computed journal quantity 907, a checkpoint timing 908, a base volume creation timing 909, a hint 910 used when the journal quantity cannot be created due to some reason, an execute button 911 and a cancel button 912.

The computed journal quantity 907 is the value displayed in step 607 of FIG. 6. The checkpoint timing 908 and the base volume creation timing 909 are computed by the process of FIGS. 6 and 7, and the results of step 705 are displayed. However, the timing may be varied according to time, as indicated in the recovery management table 500 of FIG. 5. Therefore, the contents of the recovery management table 500 can be presented instead of the checkpoint timing 908 and the base volume creation timing 909. However, only the time is displayed since the value of the time 502 is issued periodically.

It is possible to allow the user to change the timings of the checkpoints and base volumes when the display including the contents of the recovery management table 500 is presented. For example, according to the recovery management table 500, a base volume is to be created at the checkpoint CP2, but if the user wishes to provide a journal mark instead of creating a base volume, the user can rewrite the table to execute such process. In this case, the program can set up the actual copy settings after warning the user that the restoration of CP1 which is planned to be performed based on the base volume created at CP2 and the before journal cannot be executed.

The hint 910 presents a hint based on conditions, such as when the number of base volumes is to be changed. For example, the following message is presented as a hint: "No update of journal is performed from 18:00 to 24:00. The timings for creating base volumes can be reduced during this time".

It is possible to perform correction in step 705 after confirming the user. In such case, either the screen can be returned to the input screen of FIG. 4, or the user can rewrite the computed journal quantity, the checkpoint timing and the base volume timing and click the execute button so that the new data is reflected on the process.

The information presented in the hint is complex in some cases. For example, there are cases in which the journal quantity is varied by time as described earlier. In such case, the data in the write management table 510 can be presented as a graph to show where the threshold is exceeded, for example.

Further, if the values 401 through 404 that the user enters in the screen of FIG. 4 are changed in the flowchart of FIG. 6, it is possible to present the values computed in the flowchart of FIG. 7 in the display areas 901 through 904 of the screen, and to either indicate the change by varying the color from the value at the time of input or by presenting characters such as (note) to the value, or output the derived value in hint 910 without changing the entered value. For example, if the value of the recovery time objective is different from the value input by the user, it is possible to indicate "(note) 20 min." in recovery time objective 904 and present that "the input value of the recovery time objective was 10 min" in the hint 910.

Based on the present embodiment, the journal volume is set up according to the operating conditions requested by the user, which include the journal retention period, the recovery point and the recovery time. Thus, the recovery management process, in other words, the creation of checkpoints and base volumes, based on the requests of the user and the use of the storage can be realized.

According further to the present embodiment, all the programs and various information of the managing computer 100 can be included in the storage 120 or in the host 110.

According to the present embodiment, the recovery point objective can be utilized as the point in which the data is restored at the checkpoints. For example, if the recovery point objective is set to ten minutes, it is possible to designate checkpoints every ten minutes to establish points for restoring data every ten minutes. Therefore, if the data in the normal operating volume is lost due to failure or the like, the data ten minutes prior thereto at most can be restored by assigning the journal corresponding to the time of the checkpoint to the corresponding base volume.

If it is impossible to satisfy the recovery time objective by the after journal, it is possible to establish a process to acquire a base volume of a certain term and to apply a before journal in order to accomplish the recovery time objective. For example, when the recovery time is set so that the data of the checkpoints is to be restored in ten minutes, the base volume may have a journal quantity in which the time for assigning the after journal exceeds ten minutes. In such case, the process orders a snapshot to be taken at the time trackable by the before journal, and assigns the before journal to the snapshot. Moreover, based on the requested recovery time objective, if it is impossible to accomplish the recovery time objective by the before journal, it is possible to establish a process to acquire a base volume of a certain period and to use an after journal so that the recovery time objective is accomplished.

Moreover, according to the journal quantity, it is determined whether to acquire multiple generations of base volumes and to use the base volumes and journals for recovery. If the recovery time is not so much of an issue, the recovery can be performed either by acquiring a few generations of base volumes or by simply using the base volume and the after journal for all recoveries.

It is possible to provide an instruction not to set up the checkpoints and base volumes during the time in which no write data is entered. Further, the assigning of checkpoints can be designated such that the interval of checkpoints is shorter when there is much write operation performed. Further, the operation of the journals can be controlled according to the status of the storage or the designated capacity of the journal volumes. For example, when a setting is computed in which the journal overflows the limited journal capacity within the retention period, a countermeasure can be presented such as deleting the before journals by putting weight on the amount of resource rather than on the recovery time.

The preferred embodiment of the present invention has been described. A first modified embodiment of the present invention relates to a computer system in which the information of the journal is the information of a before journal of data and/or the information of an after journal of data.

A second modified embodiment of the present invention relates to a computer system in which the storage system creates the information of the before journal of data corresponding only to a quantity in which the recovery time objective cannot be accomplished when restoring the volume using the information of the after journal of data, or creates the same corresponding only to a quantity in which the recovery time is further reduced if the recovery time objective is accomplished.

A third modified embodiment of the present invention relates to a computer system in which the storage system creates the information of the after journal of data corresponding only to a quantity in which the recovery time objective cannot be accomplished when restoring the volume using the information of the before journal of data, or creates the same corresponding only to a quantity in which the recovery time is further reduced if the recovery time objective is accomplished.

A fourth modified embodiment of the present invention relates to a computer system in which the capacity of the volume for retaining the journal is the volume capacity that the user is allowed to use.

A fifth modified embodiment of the present invention relates to a computer system in which if the storage system cannot provide a volume for retaining the computed quantity of the journal, the storage system does not acquire the data of the before journal, or does not acquire the data of the after journal, or acquires the data of the before journal and the data of the after journal so that the data do not overlap as data corresponding to the same time period.

A sixth modified embodiment of the present invention relates to a computer system in which if the storage system cannot provide a volume for retaining the computed quantity of the journal, the system reduces the retention period of the journal.

A seventh modified embodiment of the present invention relates to a computer system in which the managing computer determines a generation number and timing of data replication of the volume based on the recovery time objective and/or the recovery point objective, the journal retention period and the journal information, and sets the generation number and the timing of the data replication of the volume.

An eighth modified embodiment of the present invention relates to a computer system in which the managing computer determines based on the recovery point objective a timing of a checkpoint being a point in which recovery is performed using the journal, and sets the timing of the checkpoint.

A ninth modified embodiment of the present invention relates to a computer system in which the managing computer acquires a computed tendency of the journal, presents a plan to increase or decrease the checkpoint processing, and increases or decreases the checkpoints.

A tenth modified embodiment of the present invention relates to a computer system in which if the recovery point can be realized only by the replication of the volume, the managing computer only sets the replication of the volume and does not utilize journals for restoration.

An eleventh modified embodiment of the present invention relates to a managing computer for managing a storage system retaining a journal of the data stored in the volume and a volume replicating the data stored in the volume for restoring the data stored in the volume at any update time point by the journal and the replicated volume, the managing computer forming a computer system by the storage system being connected via a network and a host computer for reading and writing data stored in the volume of the storage system, the managing computer comprising a memory for storing a storage cooperative program, a storage access analysis program, a journal capacity determination program, a copy schedule determination program, a host cooperative program and a storage management information; a CPU for controlling the operation of the whole managing computer; and an interface for network connection; wherein the managing computer acquires a register creation demand including a recovery time objective which is the time of recovery and/or a recovery point objective which is the update time point and a journal retention period which is the period during which the journal is retained, monitors the journal of the data stored in the volume, computes the quantity of the journal, and determines the capacity of the volume for retaining the journal.

A twelfth modified embodiment of the present invention relates to a managing computer in which an information of the journal is an information of a before journal of data and/or an information of an after journal of data.

A thirteenth modified embodiment of the present invention relates to a managing computer in which the capacity of the volume for retaining the journal is the volume capacity that the user is allowed to use.

A fourteenth modified embodiment of the present invention relates to a managing computer that determines a generation number and timing of data replication of the volume based on the recovery time objective and/or the recovery point objective, the journal retention period and the journal information, and sets the generation number and the timing of the data replication of the volume.

A fifteenth modified embodiment of the present invention relates to a managing computer that determines based on the recovery point objective a timing of a checkpoint being a point in which recovery is performed using the journal, and sets the timing of the checkpoint.

A sixteenth modified embodiment of the present invention relates to a managing computer that acquires a computed tendency of the journal, presents a plan to increase or decrease the checkpoint processing, and increases or decreases the checkpoints.

A seventeenth modified embodiment of the present invention relates to a managing computer in which if the recovery point can be realized only by the replication of the volume, the managing computer only sets the replication of the volume and does not utilize journals for restoration.

An eighteenth modified embodiment of the present invention relates to a recovery management method of a computer system comprising a storage system having a volume which is a storage area, a managing computer for managing the storage system, and a host computer for reading and writing data stored in the volume of the storage system, which are connected via a network, wherein the recovery management method comprises retaining a journal of the data stored in the volume and a volume replicating the data stored in the volume; restoring the data stored in the volume at any update time point by the journal and the replicated volume; acquiring a register creation demand including a recovery time objective which is the time of recovery and/or a recovery point objective which is the update time point and a journal retention period which is the period during which the journal is retained; monitoring the journal of the data stored in the volume; computing the quantity of the journal; and determining the capacity of the volume for retaining the journal.

What is claimed is:

1. A computer system comprising a storage system having a volume which is a storage area, a managing computer for managing the storage system, and a host computer for reading and writing data in the volume of the storage system, which are connected via a network: wherein the storage system retains a journal of the data stored in the volume and a volume replicating the data stored in the volume, for restoring the data stored in the volume at any update time point by the journal and the replicated volume; and the managing computer acquires a register creation demand with respect to the volume retaining the journal, the register creation demand including a recovery time objective which is the time of recovery and/or a recovery point objective which is the update time point and a journal retention period which is the period during which the journal is retained, monitors the journal of the data stored in the volume, computes the quantity of the journal, and determines the capacity of the volume for retaining the journal.

2. The computer system according to claim 1, wherein an information of the journal is an information of a before journal of data and/or an information of an after journal of data.

3. The computer system according to claim 2, wherein the storage system creates the information of the before journal of data corresponding only to a quantity in which the recovery time objective cannot be accomplished when restoring the volume using the information of the after journal of data, or creates the same corresponding only to a quantity in which the recovery time is further reduced if the recovery time objective is accomplished.

4. The computer system according to claim 2, wherein the storage system creates the information of the after journal of data corresponding only to a quantity in which the recovery time objective cannot be accomplished when restoring the volume using the information of the before journal of data, or creates the same corresponding only to a quantity in which the recovery time is further reduced if the recovery time objective is accomplished.

5. The computer system according to claim 1, wherein the capacity of the volume for retaining the journal is the volume capacity that the user is allowed to use.

6. The computer system according to claim 2, wherein if the storage system cannot provide a volume for retaining the computed quantity of the journal, the storage system does not acquire the data of the before journal, or does not acquire the data of the after journal, or acquires the data of the before journal and the data of the after journal so that the data do not overlap as data corresponding to the same time period.

7. The computer system according to claim 1, wherein if the storage system cannot provide a volume for retaining the computed quantity of the journal, the system reduces the retention period of the journal.

8. The computer system according to claim 1, wherein the managing computer determines a generation number and timing of data replication of the volume based on the recovery time objective and/or the recovery point objective, the journal retention period and the journal information, and sets the generation number and the timing of the data replication of the volume.

9. The computer system according to claim 1, wherein the managing computer determines based on the recovery point objective a timing of a checkpoint being a point in which recovery is performed using the journal, and sets the timing of the checkpoint.

10. The computer system according to claim 9, wherein the managing computer acquires a computed tendency of the journal, presents a plan to increase or decrease the checkpoint processing, and increases or decreases the checkpoints.

11. The computer system according to claim 1, wherein if the recovery point can be realized only by the replication of the volume, the managing computer only sets the replication of the volume and does not utilize a restore method using journals.

12. A managing computer for managing a storage system retaining a journal of the data stored in the volume and a volume replicating the data stored in the volume and restoring the data stored in the volume at any update time point by the journal and the replicated volume, the managing computer forming a computer system by the storage system being connected via a network and a host computer for reading and writing data stored in the volume of the storage system, the managing computer comprising:

a memory for storing the storage management information;

a CPU for controlling the operation of the whole managing computer; and an interface for network connection;

wherein the managing computer acquires a register creation demand for the volume retaining the journal, including a recovery time objective which is the time of recovery and/or a recovery point objective which is the update time point and a journal retention period which is the period during which the journal is retained, monitors the journal of the data stored in the volume, computes the quantity of the journal, and determines the capacity of the volume for retaining the journal.

13. The managing computer according to claim 12, wherein an information of the journal is an information of a before journal of data and/or an information of an after journal of data.

14. The managing computer according to claim 12, wherein the capacity of the volume for retaining the journal is the volume capacity that the user is allowed to use.

15. The managing computer according to claim 12, wherein the managing computer determines a generation number and timing of data replication of the volume based on the recovery time objective and/or the recovery point objective, the journal retention period and the journal information, and sets the generation number and the timing of the data replication of the volume.

16. The managing computer according to claim 12, wherein the managing computer determines based on the recovery point objective a timing of a checkpoint being a point in which recovery is performed using the journal, and sets the timing of the checkpoint.

17. The managing computer according to claim 16, wherein the managing computer acquires a computed tendency of the journal, presents a plan to increase or decrease the checkpoint processing, and increases or decreases the checkpoints.

18. The managing computer according to claim 12, wherein if the recovery point can be realized only by the replication of the volume, the managing computer only sets the replication of the volume and does not utilize a restore method using journals.

19. A recovery management method of a computer system comprising a storage system having a volume which is a storage area, a managing computer for managing the storage system, and a host computer for reading and writing data stored in the volume of the storage system, which are connected via a network, wherein the recovery management method comprises:

retaining a journal of the data stored in the volume and a volume replicating the data stored in the volume;

restoring the data stored in the volume at any update time point by the journal and the replicated volume;

acquiring a register creation demand for the volume retaining the journal, including a recovery time objective which is the time of recovery and/or a recovery point objective which is the update time point and a journal retention period which is the period during which the journal is retained;

monitoring the journal of the data stored in the volume;

computing the quantity of the journal; and determining the capacity of the volume for retaining the journal.

\* \* \* \* \*